(12) United States Patent
Bailey (10) Patent No.: US 11,979,362 B2
(45) Date of Patent: May 7, 2024

(54) BUSINESS-TO-BUSINESS CHAT ROUTING

(71) Applicant: Oracle International Corporation, Redwood Shores, CA (US)

(72) Inventor: Alasdair John Joseph Bailey, Perth (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/940,242

(22) Filed: Sep. 8, 2022

(65) Prior Publication Data
US 2024/0089220 A1  Mar. 14, 2024

(51) Int. Cl.
*H04L 51/02* (2022.01)
*G06F 40/20* (2020.01)

(52) U.S. Cl.
CPC .............. *H04L 51/02* (2013.01); *G06F 40/20* (2020.01)

(58) Field of Classification Search
CPC ................................. H04L 51/02; G06F 40/20
See application file for complete search history.

(56) References Cited

U.S. PATENT DOCUMENTS

| | | | |
|---|---|---|---|
| 8,213,966 B1 * | 7/2012 | Typrin ................ | H04M 3/4931 455/418 |
| 2015/0286747 A1 * | 10/2015 | Anastasakos ....... | G06F 16/9535 707/776 |
| 2020/0344185 A1 * | 10/2020 | Singaraju ............ | G06F 16/9024 |
| 2021/0029249 A1 * | 1/2021 | Erhart ................. | H04M 3/5175 |
| 2023/0137166 A1 * | 5/2023 | Annadata ............. | H04L 51/04 709/206 |

OTHER PUBLICATIONS

"Agility without limits", Microsoft Dynamics 365, Retrieved from https://dynamics.microsoft.com/en-us/, Retrieved on Sep. 2022, 8 Pages.
"Explore the Sales Cloud features that power sales", Retrieved from https://www.salesforce.com/products/sales-cloud/features/, Retrieved on Sep. 2022, 5 Pages.
"Scale service that customers love", Retrieved from https://www.salesforce.com/products/service-cloud/overview/, Retrieved on Sep. 2022, 9 Pages.

* cited by examiner

*Primary Examiner* — Soe Hlaing
(74) *Attorney, Agent, or Firm* — Invoke (57) ABSTRACT

Techniques for business-to-business (B2B) chat routing are disclosed, including: receiving, by a B2B chatbot during a chat session with a user, user input including a user-supplied business name; performing a business lookup based at least on the user-supplied business name, to obtain a canonical business name and a unique business identifier associated with the canonical business name; performing a customer relationship management (CRM) system lookup based at least on the unique business identifier, to identify a corresponding business account; routing the chat session from the B2B chatbot to a human chat agent assigned to the corresponding business account.

19 Claims, 7 Drawing Sheets

BUSINESS-TO-BUSINESS CHAT ROUTING

TECHNICAL FIELD

The present disclosure relates to business-to-business (B2B) chat systems. In particular, the present disclosure relates to B2B chatbots and routing B2B chats to appropriate human chat agents.

BACKGROUND

Many businesses provide online text-based chat services via their websites, mobile applications, etc. To satisfy demand, these businesses frequently hire human chat agents to respond to real-time chat messages from customers and/or prospective customers. Depending on the size of the business and volume of chat requests, large teams of human chat agents may be required.

In many cases, chat requests come from users affiliated with existing customers, i.e., employees of business customers with existing accounts. One or more specific human chat agents may be assigned to handle those accounts. Manually identifying the business customer associated with a chat request and routing the request to the appropriate human chat agent(s) is a time-consuming and error-prone process that can result in unacceptably long delays in answering customer questions. In addition, this approach typically requires employing generalist agents whose sole responsibility is routing chats to the appropriate specialists. Particularly in large organizations with many customers, a generalist chat agent cannot realistically be expected to know all the aliases, acronyms, and other variants of business names for every customer. Therefore, a generalist chat agent may not be able to successfully associate a chat request with the correct business account. Moreover, in an error-prone human-based routing approach, chat records may not be linked to the correct account, thus losing valuable customer history and/or the opportunity to subsequently follow up on the subject of the chat. Because the fallibility of human-based chat routing impacts the successful operation of the chat service, chat routing is fundamentally a technical problem. Solving the problem with minimal chance of human error calls for a technical solution that improves functioning of the chat system with minimal human involvement.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings.

DETAILED DESCRIPTION

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. EXAMPLE SYSTEM
   2.1. SYSTEM COMPONENTS
   2.2. DATA STORAGE
   2.3. USER AND CHAT AGENT INTERFACES
3. BUSINESS-TO-BUSINESS (B2B) CHAT ROUTING
   3.1. OBTAINING BUSINESS LOOKUP INFORMATION
   3.2. EVALUATING CONFIDENCE SCORES
   3.3. FALLBACK OPTIONS
   3.4. BUSINESS ACCOUNT LOOKUP
4. EXAMPLE EMBODIMENT
5. COMPUTER NETWORKS AND CLOUD NETWORKS
6. MICROSERVICE APPLICATIONS
   6.1. TRIGGERS
   6.2. ACTIONS
7. HARDWARE OVERVIEW
8. MISCELLANEOUS; EXTENSIONS

1. General Overview

One or more embodiments use a business-to-business (B2B) chatbot to obtain user information and, based on that information, route chats to the appropriate human agent(s). Specifically, the B2B chatbot may obtain a user-supplied business name, a location code indicating the user's geographic location, and/or other information that can help to uniquely identify the business that the user is affiliated with. Based on this information, the B2B chatbot may perform a business lookup to identify candidates for corresponding canonical business names. Each canonical business name is associated with a unique business identifier that may also be associated with a corresponding business account in a customer relationship management (CRM) system. Based on the lookup results, the B2B chatbot may route chat sessions to the appropriate human chat agent(s).

In some embodiments, business lookup results are associated with respective confidence scores. The B2B chatbot may use the confidence scores to determine the canonical business name that most likely matches the user-supplied business name. The B2B chatbot may ask the user to verify that the canonical business name is correct, before routing the chat session to a human chat agent. If none of the results satisfy a predetermined confidence threshold, the B2B chatbot may fall back on providing a list of options for the user to select from, and/or route the chat session to a human chat agent (e.g., a generalist) for further handling.

Minimizing human involvement at the initial stages of chat, and routing chat sessions to the appropriate human chat agent(s), reduces friction for the user requesting assistance. The user is not required to wait for a human to attempt to (potentially unsuccessfully) match the user with an existing customer account. In many cases, the user's first interaction with a human chat agent will be with an agent specifically assigned to the corresponding account, helping to ensure that the user gets competent assistance quickly. In addition, the B2B chatbot can associate the chat session with the account associated with the unique business identifier, significantly reducing the likelihood of a chat session record being lost and/or linked to the wrong account. Thus, one or more embodiments improve both (a) the user experience and (b) the technical operation and accuracy of the chat system and its connection to an associated CRM system.

One or more embodiments described in this Specification and/or recited in the claims may not be included in this General Overview section.

2. Example System

2.1. System Components

Figure 1:
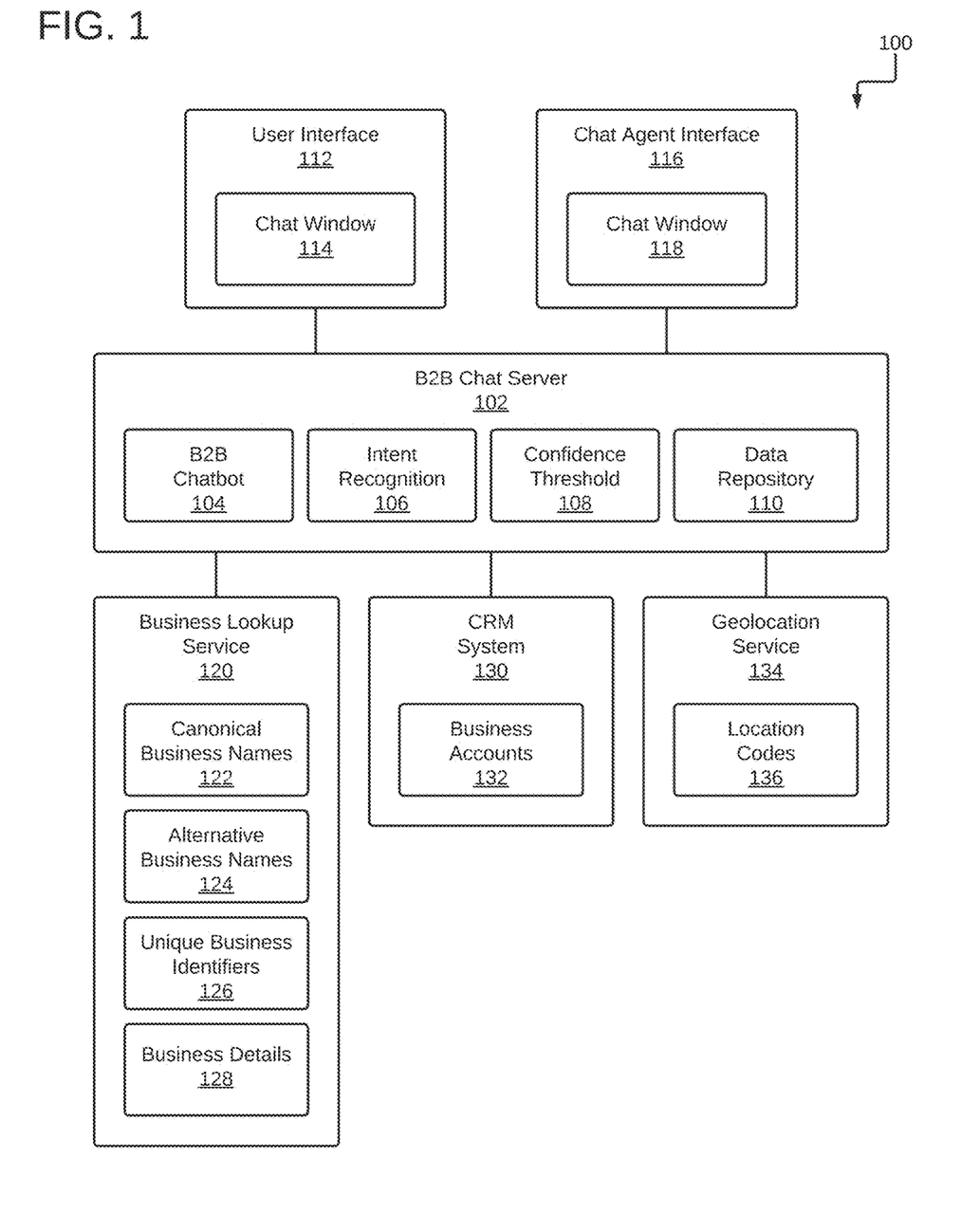
FIG. 1 shows a block diagram that illustrates an example of a system in accordance with one or more embodiments.

FIG. 1 illustrates an example of a system 100 in accordance with one or more embodiments. As illustrated in FIG. 1, the system 100 includes a business-to-business (B2B) chat server 102, a business lookup service 120, a customer relationship management (CRM) system 130, a geolocation system 134, a user interface 112, a chat agent interface 116, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, a B2B chat server 102 refers to hardware and/or software configured to perform operations for B2B chat routing, examples of which are described below. A B2B chat server 102 may include a B2B chatbot 104, i.e., hardware and/or software configured to engage in a chat with a user. The B2B chatbot 104 may be configured to receive user input in a chat session, process the user input to determine its meaning, and respond in the chat session accordingly. Specifically, the B2B chatbot 104 may be configured to use intent recognition 106, i.e., hardware and/or software configured to infer a user's intent based on the user's chat messages. Intent recognition 106 may be configured to use pattern recognition, machine learning, and/or other techniques for inferring user intent. As described herein, intent recognition 106 may be configured to infer when user input includes a user-supplied name of a business that the user is affiliated with.

The B2B chat server 102 may be configured to perform a business lookup to match a user-supplied business name with a canonical business name and its corresponding unique business identifier. A business lookup may access a business lookup service 120, e.g., by calling an application programming interface (API) (not shown) of the business lookup service 120 with the user-supplied business name. A business lookup may also be based on other information, which may or may not be user-supplied. For example, the B2B chat server 102 may be configured to use a geolocation service 134 to obtain a location code 136 indicating a location of the user's device. The B2B chat sever 102 may obtain the user's Internet Protocol (IP) address from a hypertext transfer protocol (HTTP) request or other source and submit the IP address to the geolocation service 134. Based on the IP address, the geolocation service 134 may be configured to return a corresponding location code 136. For example, the location code 136 may indicate that the user device is located in a particular country, state, county, city, longitude/latitude, and/or another geographic location that may be more or less specific.

In an embodiment, a business lookup service 120 refers to hardware and/or software configured to identify candidate canonical business names 122 and corresponding unique business identifiers 128, based on information supplied by the B2B chat server 102. As used herein, a "canonical" business name is the official name of a given business, which may be its legally recognized name (e.g., as listed in articles of incorporation and/or other formal business documents). A canonical business name 122 may be different than the user-supplied business name, despite referring to the same business. The business lookup service 120 may be configured to store alternate business names 124 that are mapped to the corresponding canonical business names 122.

An alternate business name 124 may be an acronym, alias, misspelling, and/or other variation of a particular canonical business name 122. For example, the business known officially as "Meta Platforms, Inc." also does business as "Meta" and was formerly known as "Facebook, Inc." or just "Facebook," sometimes shortened as "FB." Other products and services owned by Meta include Instagram (a.k.a. "Insta") and WhatsApp. The business lookup service 120 may store mappings of alternative business names 124 to the corresponding canonical business names 122 (e.g., "Facebook" to "Meta Platforms, Inc."). The business lookup service 120 may also be configured to store business details 128 associated with specific canonical business names 122, such as website addresses (e.g., corporate websites), industries (e.g., social media, construction, aviation, etc.), mailing addresses (e.g., corporate mailing addresses), revenue data, employee headcounts, etc. Business details 128, if available, may help distinguish between different companies having the same or similar names. As discussed in further detail below, business details 128 may be used in a chat session to help verify that a suggested canonical business name is correct.

For each particular canonical business name 122 returned by the business lookup service 120 in response to a business lookup request, the business lookup service 120 may be configured to also generate and return an associated confidence score. A confidence score indicates a relative or absolute likelihood that the particular candidate is a match for the information provided by the B2B chat server 102 (e.g., user-supplied business name and location code). The B2B chat server 102 may be configured to use confidence scores to filter and evaluate results returned by the business lookup service 120. For example, the B2B chat server 102 may be configured to store a confidence threshold 108, which may be predetermined and/or configurable, indicating a minimum confidence score needed to consider a canonical business name 122 a sufficiently likely match.

In an embodiment, a customer relationship management (CRM) system 130 refers to hardware and/or software configured to manage business accounts 132. Each business account 132 includes B2B customer relationship data such as contact names, interaction histories, chat logs, phone numbers, email addresses, social media handles, the name(s) of human chat agent(s) and/or other representatives assigned to the business account 132. Each business account 132 is associated with a unique business identifier that either matches or maps to the unique business identifiers 126 used by the business lookup service 120.

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

In one or more embodiments, a data repository 110 is any type of storage unit and/or device (e.g., a file system, database, collection of tables, and/or any other storage mechanism) for storing data. The data repository 110 may include multiple different storage units and/or devices. The multiple different storage units and/or devices may or may not be of the same type or located at the same physical site. The data repository 110 may be implemented or executed on the same computing system as the B2B chat server 102 and/or on a computing system separate from the B2B chat server 102. The data repository 110 may be communicatively coupled to the B2B chat server 102 via a direct connection or via a network. Data storage may be implemented across any of the components of the system 100.

2.3. User and Chat Agent Interfaces

In one or more embodiments, a user interface 112 refers to hardware and/or software configured to facilitate communications between a user and the B2B chat server 102. Specifically, the user interface 112 includes a chat window 114 that allows a user (e.g., an employee of a business having an associated business account 132) to interact with a B2B chatbot 104 and/or one or more human chat agents. A human chat agent may access a chat agent interface 116 that also includes a chat window 118, which may be different from the user interface 112's chat window 114. For example, the chat agent interface 116's chat window 118 may include customer service features, such as controls for transferring the chat session to another agent, looking up business accounts, etc. One or more features described below with respect to the user interface 112's chat window 114 may also apply to the chat agent interface 116's chat window 118.

The interface 112 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 112 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 112 may be specified in one or more other languages, such as Java, Python, C, or C++.

3. Business-to-Business (B2B) Chat Routing

FIGS. 2A-2D illustrate an example set of operations for business-to-business (B2B) chat routing in accordance with one or more embodiments. One or more operations illustrated in FIGS. 2A-2D may be modified, rearranged, or omitted all together. Accordingly, the particular sequence of operations illustrated in FIGS. 2A-2D should not be construed as limiting the scope of one or more embodiments. In the following discussion, operations are described as being performed by a B2B chatbot. Alternatively or additionally, one or more of the following operations may be performed by another component.

3.1. Obtaining Business Lookup Information

Figure 2A:
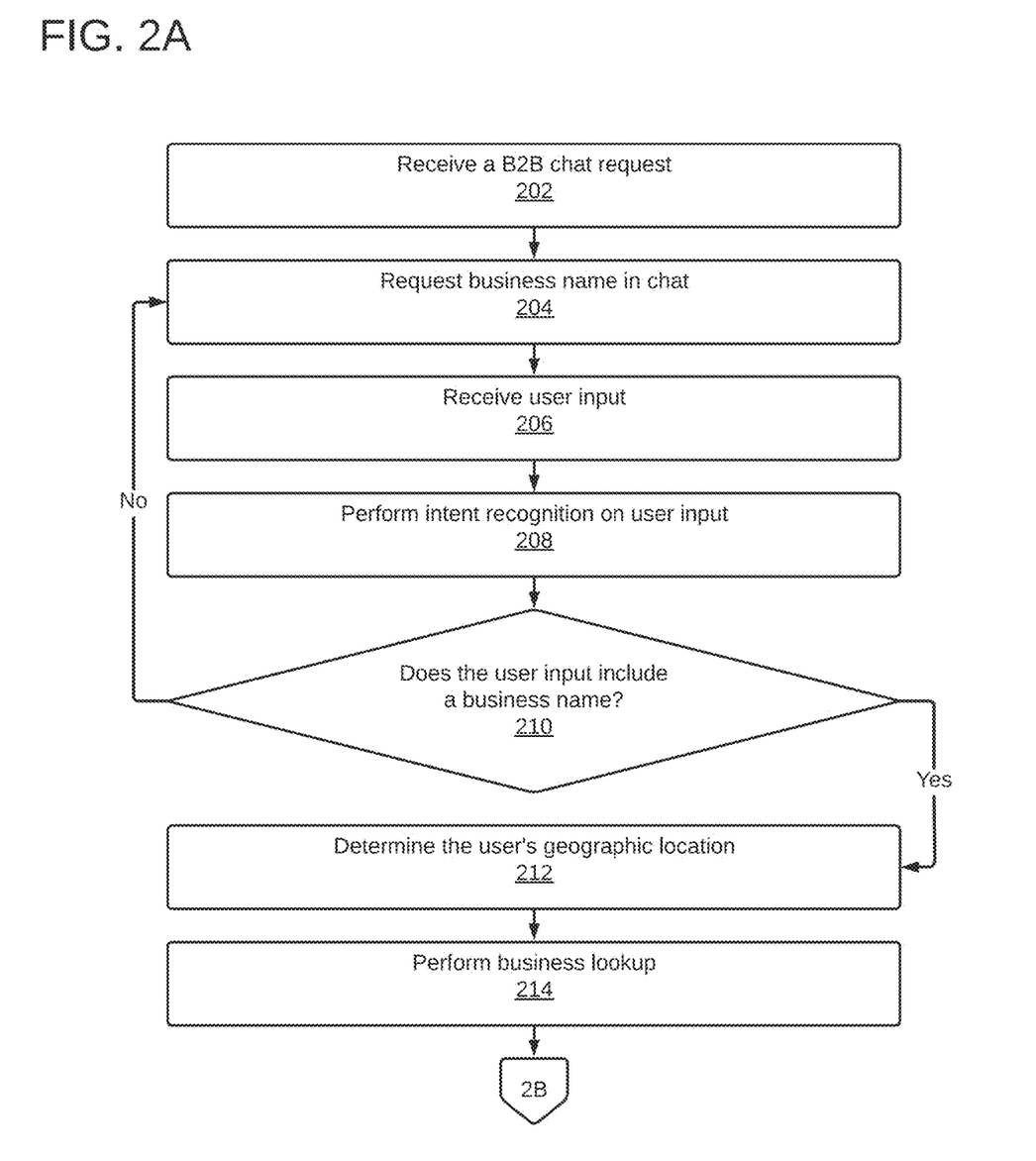
FIGS. 2A-2D illustrate an example set of operations for business-to-business (B2B) chat routing in accordance with one or more embodiments.

In an embodiment, a B2B chatbot receives a B2B chat request (Operation 202). For example, a user may enter a question into a chat box (e.g., on a website, a mobile app, etc.). During the chat session, the chatbot may request the name of a business that the user is affiliated with (Operation 204). Subsequently, the chatbot receives user input (Operation 206), i.e., a chat message, and performs intent recognition on the user input (Operation 208).

Based on intent recognition, the chatbot determines whether the user input includes a user-supplied business name (Operation 210). If the user input does not include a business name, then the chatbot may continue the chat, for example, by requesting the business name again (Operation 204). If the chatbot continues to be unable to detect a business name in the user input, then the chatbot may route the chat session to a generalist human chat agent (not shown).

In an embodiment, the B2B chatbot determines additional information about the user. For example, the B2B chatbot may determine the geographic location (Operation 212). To determine the user's geographic location, the chat may obtain the user's Internet Protocol (IP) address from a hypertext transfer protocol (HTTP) request or other source and submit the IP address to a geolocation service. Based on the IP address, the geolocation service may return a corresponding location code. For example, the location code may indicate that the user device is located in a particular country, state, county, city, longitude/latitude, and/or another geographic location that may be more or less specific.

Once the chatbot has enough information, it may perform a business lookup (Operation 214) to try to identify a match for the user-supplied business name. A business lookup may access a business lookup service, e.g., by calling an API of the business lookup service with the user-supplied business name. The API call may also include other information, such as a location code indicating the user's geographic location. In response to the API call, the business lookup service may return one or more results, i.e., canonical business names.

For each canonical business name, the business lookup service may also return a corresponding confidence score.

3.2. Evaluating Confidence Scores

Figure 2B:
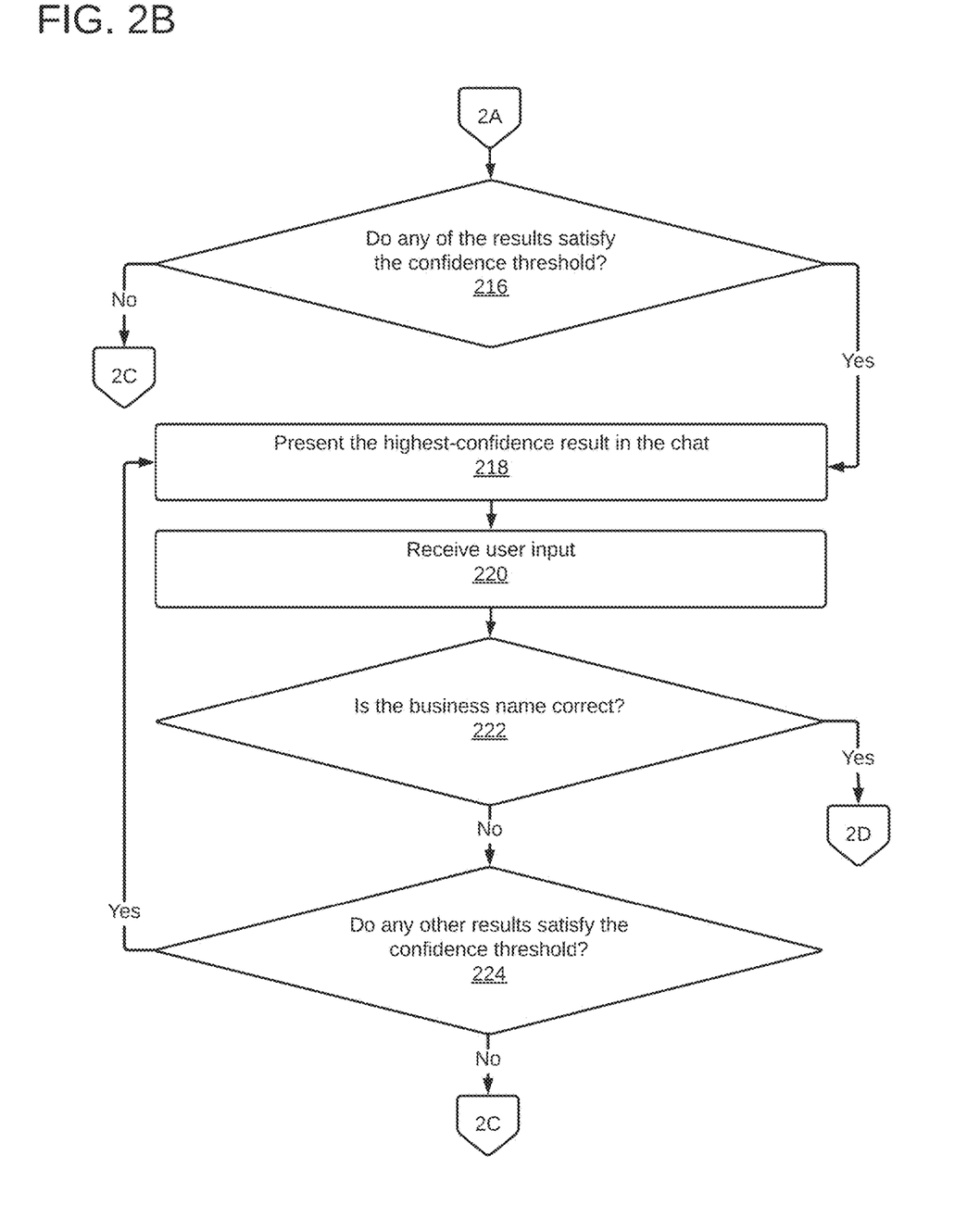

The chatbot may determine whether any of the results returned by the business lookup service satisfy a confidence threshold (Operation 216). If none of the results satisfy the confidence threshold, the chatbot may resort to one or more fallback options as discussed below.

If any of the results do satisfy the confidence threshold, the chatbot may present the highest-confidence result in the chat (Operation 218). Specifically, the chatbot may present the canonical business name associated with the highest confidence score and ask the user to verify that the canonical business name is correct, i.e., refers to the same business as the user-supplied business name. The system receives user input (Operation 220) and analyzes the user input to determine whether the user indicated that the canonical business name is correct (Operation 222). If the user indicated that the canonical business name is correct, then the chatbot may proceed to perform a business account lookup and route the chat session as discussed below.

If the user indicates that the presented canonical business name is not correct, the chatbot may determine whether any other results satisfy the confidence threshold (Operation 224). If any other results do satisfy the confidence threshold, then the chatbot may present the next-highest-confidence result in the chat (Operation 218) so that the user can indicate whether that business name is correct. If none of the results that satisfy the confidence threshold are correct, then the chatbot may resort to one or more fallback options as discussed below.

3.3. Fallback Options

Figure 2C:
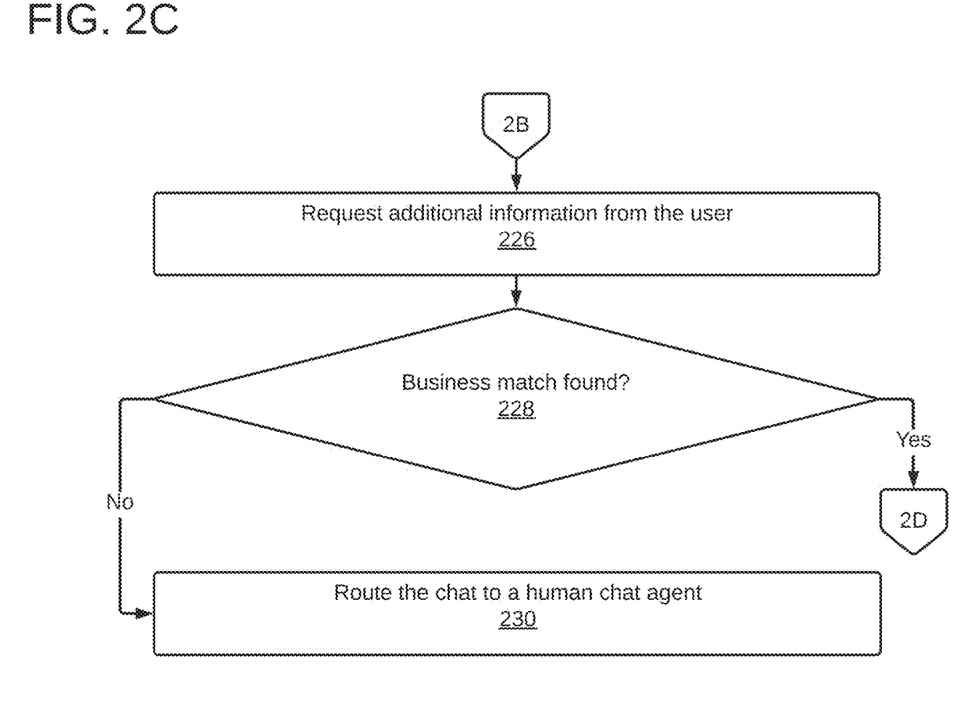

In some cases, the chatbot may be unable to identify a canonical business name associated with the user in the chat session. In such cases, the chatbot may request additional information from the user (Operation 226). For example, the chatbot may present a list of all the candidate canonical business names—including any that do not satisfy the confidence threshold—and ask the user to indicate whether any business name in the list is correct. Alternatively or additionally, the chatbot may ask for more business-related information, such as a city where the business is headquartered, the name of the chief executive officer, and/or other information that may help to identify the canonical business name. Upon receiving additional information, the chatbot may perform a new business lookup (not shown) and repeat the process of attempting to determine whether any of the lookup results is correct.

If the chatbot is able to identify the correct canonical business name, then the chatbot may proceed to perform a business account lookup and route the chat session as discussed below. If the chatbot is still unable to identify the correct canonical business name, then the chatbot may route the chat to a generalist human chat agent (Operation 230).

3.4. Business Account Lookup

Figure 2D:
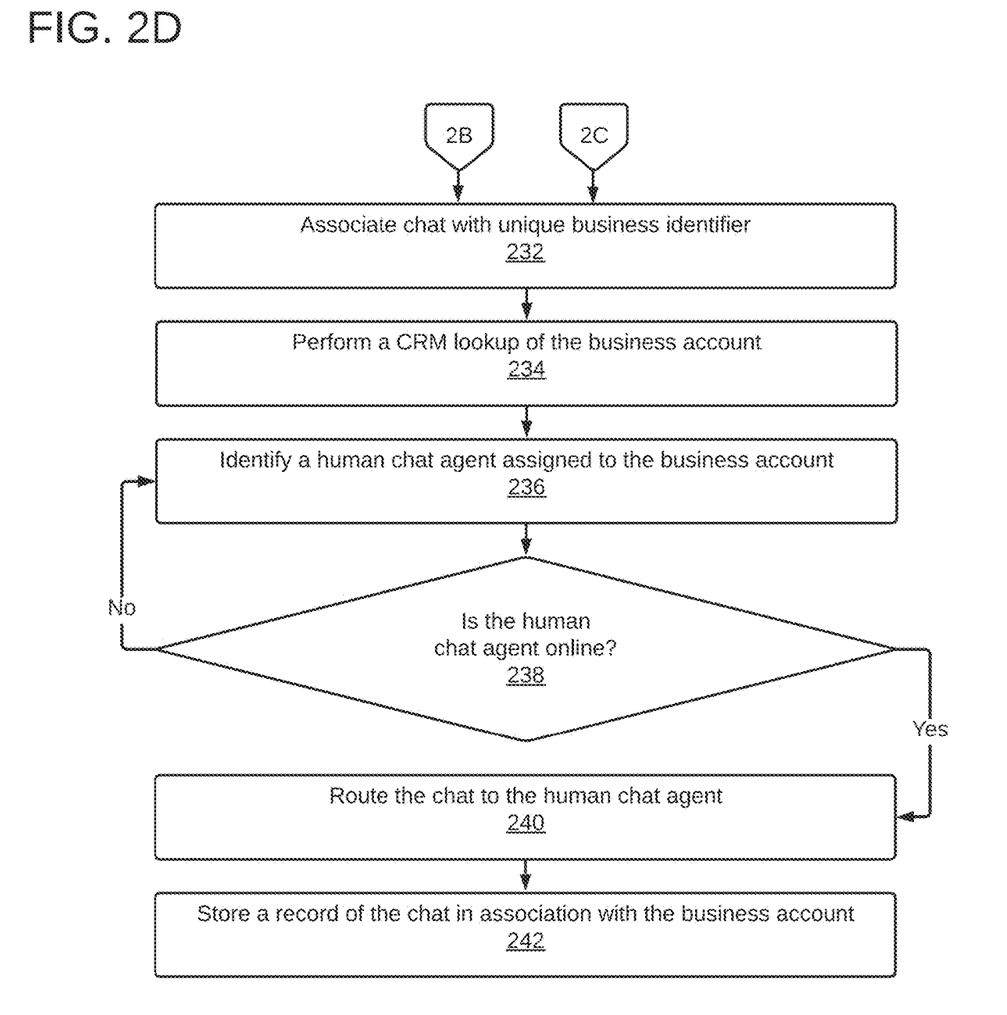

If the chatbot is able to identify the correct canonical business name, the chatbot may associate the chat session with the unique business identifier associated with that business name (Operation 232). In addition, the chatbot may perform a CRM lookup of the business account associated with that unique business identifier (Operation 234). Based on the results of the business lookup, the chatbot may identify a human chat agent assigned to the business account (Operation 236). To identify the human chat agent, the chatbot may query an API associated with the business account, to get data indicating which human chat agent(s) is/are assigned to the business account.

In an embodiment, routing a chat session to a human chat agent is contingent on the human chat agent being online. The chatbot may determine whether the human chat agent is online (Operation 238), for example, by querying the chat server to determine the agent's status. If the agent is not online, the chatbot may identify another human chat agent assigned to the business account (Operation 236) and determine whether that agent is online (Operation 238). If none of the assigned agents are online, the chatbot may route the chat session to a generalist human chat agent (not shown). If at least one of the assigned agents is online, the chatbot routes the chat session to that agent (Operation 240). The human chat agent proceeds to handle the chat with the user. During the chat session and/or after the chat session concludes, the chatbot may store a record of the chat session in association with the business account (Operation 242), thus ensuring that the record is not lost and/or associated with the wrong account.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
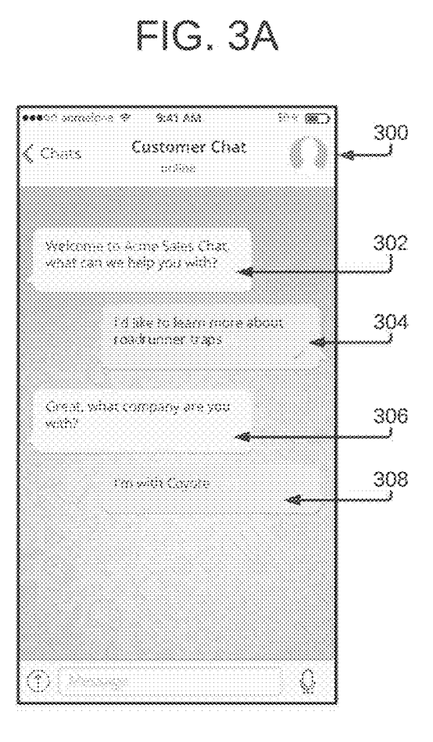
FIGS. 3A and 3B illustrate an example of business-to-business (B2B) chat routing in accordance with one or more embodiments.
Figure 3B:
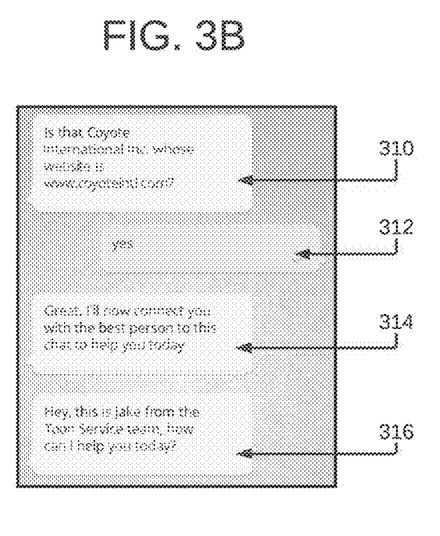

Specifically, FIGS. 3A and 3B illustrate an example of business-to-business (B2B) chat routing in accordance with one or more embodiments. As shown in FIG. 3A, a chat session starts with a B2B chatbot (on the left) offering assistance (message 302) in a chat window 300. When the user requests assistance (message 304), the chatbot asks what company the user is with (message 306). The chatbot uses intent recognition to determine that the user's response (message 308) includes the user-supplied business name, "Coyote."

In addition, without informing the user, the chatbot obtains the user's IP address and performs a geolocation lookup (not shown) using the IP address. The geolocation lookup returns an International Standards Organization (ISO) country code of "US" (not shown). The chatbot performs a business lookup based on the user-supplied business name ("Coyote") and the location code ("US"). The business lookup service (not shown) searches a database of worldwide companies (including their official names, aliases, and acronyms) and returns a list of results with corresponding confidence scores and additional information associated with the businesses (e.g., corporate websites).

Upon receiving the business lookup results, the chatbot evaluates the list of results to determine whether any of the results are associated with sufficiently high confidence scores. In this example, the confidence threshold is 0.5 and a result's confidence score must be greater than that. As seen in FIG. 3B, the chatbot presents the highest-confidence result ("Coyote International Inc.") in the chat session, along with the business website (message 310). Based on the information presented, the user confirms that this is the correct canonical business name (message 312), i.e., that the user-supplied business name "Coyote" did, indeed, refer to "Coyote International Inc."

Once the chatbot confirms the business name, it can associate the chat session with the unique business identifier (not shown) associated with Coyote International Inc. In addition, the chatbot performs a CRM system lookup to obtain an account record associated with that identifier. The chatbot queries the account record's API to determine which human chat agent is assigned to the business account. The chatbot then informs the user that it is routing the chat session to a human chat agent (message 314). The next message (message 316) comes from the human chat agent ("Jake"), who is qualified to assist the user with their specific business needs.

At the conclusion of the chat session, the text of the chat is captured and saved to the account record in the CRM system, for future reference. The account record is also updated to record the date and time of the chat session. Thus, without risking human error and/or delay, the correct business is identified, the chat session is routed to an a human chat agent assigned to that business, and the chat record is successfully associated with the correct business account.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

6.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

6.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 4:
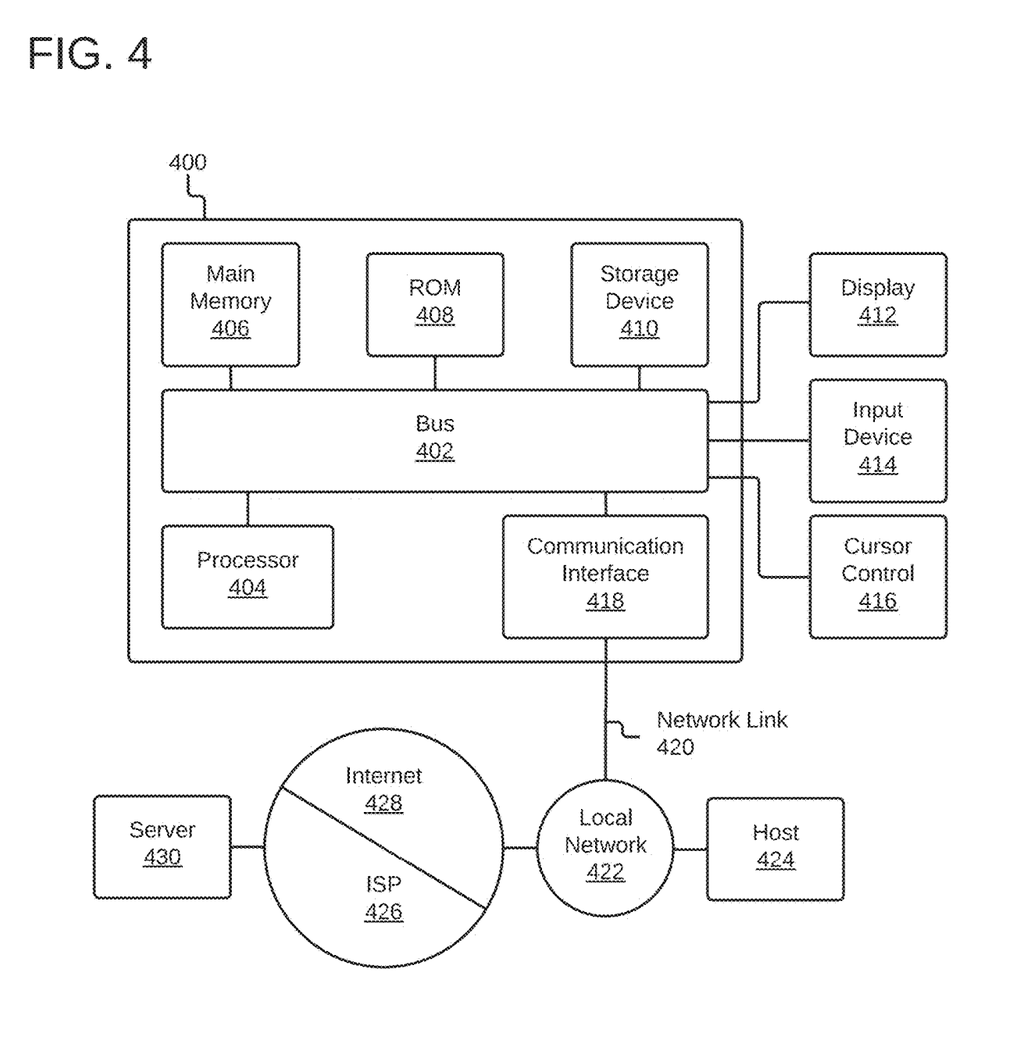
FIG. 4 shows a block diagram that illustrates a computer system in accordance with one or more embodiments.

For example, FIG. 4 is a block diagram that illustrates a computer system 400 upon which one or more embodiments of the invention may be implemented. The computer system 400 includes a bus 402 or other communication mechanism for communicating information, and a hardware processor 404 coupled with bus 402 for processing information. The hardware processor 404 may be, for example, a general-purpose microprocessor.

The computer system 400 also includes a main memory 406, such as a random access memory (RAM) or other dynamic storage device, coupled to bus 402 for storing information and instructions to be executed by processor 404. The main memory 406 also may be used for storing temporary variables or other intermediate information during execution of instructions to be executed by processor 404. Such instructions, when stored in non-transitory storage media accessible to the processor 404, render the computer system 400 into a special-purpose machine that is customized to perform the operations specified in the instructions.

The computer system 400 further includes a read only memory (ROM) 408 or other static storage device coupled to the bus 402 for storing static information and instructions for the processor 404. A storage device 410, such as a magnetic disk or optical disk, is provided and coupled to the bus 402 for storing information and instructions.

The computer system 400 may be coupled via the bus 402 to a display 412, such as a cathode ray tube (CRT), for displaying information to a computer user. An input device 414, including alphanumeric and other keys, is coupled to the bus 402 for communicating information and command selections to the processor 404. Another type of user input device is cursor control 416, such as a mouse, a trackball, or cursor direction keys for communicating direction information and command selections to the processor 404 and for controlling cursor movement on the display 412. This input device typically has two degrees of freedom in two axes, a first axis (e.g., x) and a second axis (e.g., y), that allows the device to specify positions in a plane.

The computer system 400 may implement techniques described herein using customized hard-wired logic, one or more ASICs or FPGAs, firmware, and/or program logic which in combination with the computer system 400 causes or programs the computer system 400 to be a special-purpose machine. In one or more embodiments, the techniques herein are performed by the computer system 400 in response to the processor 404 executing one or more sequences of one or more instructions contained in the main memory 406. Such instructions may be read into the main memory 406 from another storage medium, such as the storage device 410. Execution of the sequences of instructions contained in the main memory 406 causes the processor 404 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 410. Volatile media includes dynamic memory, such as the main memory 406. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 402. Transmission media can also take the form of acoustic or light waves, such as those generated during radio frequency (RF) and infrared data communications.

Various forms of media may be involved in carrying one or more sequences of one or more instructions to the processor 404 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 400 can receive the data on the telephone line or other communications medium and use an infrared transmitter to convert the data to an infrared signal. An infrared detector can receive the data carried in the infrared signal and appropriate circuitry can place the data on the bus 402. The bus 402 carries the data to the main memory 406, from which the processor 404 retrieves and executes the instructions. The instructions received by the main memory 406 may optionally be stored on the storage device 410, either before or after execution by processor 404.

The computer system 400 also includes a communication interface 418 coupled to the bus 402. The communication interface 418 provides a two-way data communication coupling to a network link 420 that is connected to a local network 422. For example, the communication interface 418 may be an integrated services digital network (ISDN) card, cable modem, satellite modem, or a modem to provide a data communication connection to a corresponding type of telephone line. As another example, the communication interface 418 may be a local area network (LAN) card configured to provide a data communication connection to a compatible LAN. Wireless links may also be implemented. In any such implementation, the communication interface 418 sends and receives electrical, electromagnetic, or optical signals that carry digital data streams representing various types of information.

The network link 420 typically provides data communication through one or more networks to other data devices. For example, the network link 420 may provide a connection through a local network 422 to a host computer 424 or to data equipment operated by an Internet Service Provider (ISP) 426. The ISP 426 in turn provides data communication services through the world wide packet data communication network now commonly referred to as the "Internet" 428. The local network 422 and Internet 428 both use electrical, electromagnetic, or optical signals that carry digital data streams. The signals through the various networks and the signals on the network link 420 and through the communication interface 418, which carry the digital data to and from the computer system 400, are example forms of transmission media.

The computer system 400 can send messages and receive data, including program code, through the network(s), network link 420, and communication interface 418. In the Internet example, a server 430 might transmit a requested code for an application program through the Internet 428, ISP 426, local network 422, and communication interface 418.

The received code may be executed by processor 404 as it is received, and/or may be stored in the storage device 410 or other non-volatile storage for later execution.

8. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
receiving, by a business-to-business (B2B) chatbot during a chat session with a user, user input comprising a user-supplied business name;
performing a business lookup based at least on the user-supplied business name, to obtain a first canonical business name and a unique business identifier associated with the first canonical business name;
wherein the first canonical business name is one of a plurality of canonical business names obtained responsive to the business lookup;
wherein each canonical business name in the plurality of canonical business names is associated with a respective unique business identifier;
wherein each canonical business name in the plurality of canonical business names is further associated with a respective confidence score;
determining that of the plurality of canonical business names, the first canonical business name is associated with a highest confidence score;
responsive to determining that the first canonical business name is associated with the highest confidence score, presenting the first canonical business name in the chat session;

receiving user input indicating that the first canonical business name is correct;

performing a customer relationship management (CRM) system lookup based at least on the unique business identifier, to identify a corresponding business account;

routing the chat session from the B2B chatbot to a human chat agent assigned to the corresponding business account.

2. The one or more non-transitory machine-readable media of claim 1, the operations further comprising:

performing intent recognition on the user input to determine that the user input comprises the user-supplied business name.

3. The one or more non-transitory machine-readable media of claim 1, the operations further comprising:

determining an Internet Protocol (IP) address of the user;

performing a geolocation lookup based at least on the IP address, to obtain a location code associated with the IP address;

wherein the business lookup is further based on the location code.

4. The one or more non-transitory machine-readable media of claim 1, the operations further comprising:

determining that the highest confidence score associated with the first canonical business name satisfies a predetermined confidence threshold.

5. The one or more non-transitory machine-readable media of claim 1, the operations further comprising:

storing a record of the chat session in association with the business account.

6. The one or more non-transitory machine-readable media of claim 1, the operations further comprising:

requesting, by the B2B chatbot during the chat session, the user-supplied business name.

7. The one or more non-transitory machine-readable media of claim 1, the operations further comprising:

querying an application programming interface (API) associated with the corresponding business account to identify the human chat agent assigned to the corresponding business account.

8. The one or more non-transitory machine-readable media of claim 1, the operations further comprising:

determining an online status of the human chat agent;

wherein routing the chat session from the B2B chatbot to the human chat agent is contingent on the online status indicating that the human chat agent is online.

9. The one or more non-transitory machine-readable media of claim 1, wherein the user-supplied business name is different than the first canonical business name.

10. The one or more non-transitory machine-readable media of claim 9, wherein the user-supplied business name is an acronym of the first canonical business name.

11. The one or more non-transitory machine-readable media of claim 9, wherein the user-supplied business name is an alias of the first canonical business name.

12. One or more non-transitory machine-readable media storing instructions that, when executed by one or more processors, cause performance of operations comprising:

receiving, by a business-to-business (B2B) chatbot during a chat session with a user, user input comprising a user-supplied business name;

performing a business lookup based at least on the user-supplied business name, to obtain a first canonical business name and a unique business identifier associated with the first canonical business name;

wherein the first canonical business name is one of a plurality of canonical business names obtained responsive to the business lookup;

wherein each canonical business name in the plurality of canonical business names is associated with a respective unique business identifier;

wherein each canonical business name in the plurality of canonical business names is further associated with a respective confidence score;

determining that of the plurality of canonical business names, a second canonical business name is associated with a higher confidence score than the first canonical business name;

responsive to determining that the second canonical business name is associated with a higher confidence score than the first canonical business name, presenting the second canonical business name in the chat session;

receiving user input indicating that the second canonical business name is incorrect;

responsive to receiving the user input indicating that the second canonical business name is incorrect, presenting the first canonical business name in the chat session;

receiving user input indicating that the first canonical business name is correct;

performing a customer relationship management (CRM) system lookup based at least on the unique business identifier, to identify a corresponding business account;

routing the chat session from the B2B chatbot to a human chat agent assigned to the corresponding business account.

13. One or more non-transitory machine-readable media storing instructions that, when executed by one or more processors, cause performance of operations comprising:

receiving, by a business-to-business (B2B) chatbot during a chat session with a user, user input comprising a user-supplied business name;

performing a business lookup based at least on the user-supplied business name, to obtain a first canonical business name and a unique business identifier associated with the first canonical business name;

wherein the first canonical business name is one of a plurality of canonical business names obtained responsive to the business lookup;

wherein each canonical business name in the plurality of canonical business names is associated with a respective unique business identifier;

wherein each canonical business name in the plurality of canonical business names is further associated with a respective confidence score;

determining that none of the respective confidence scores associated with the plurality of canonical business names satisfy a predetermined confidence threshold;

responsive to determining that none of the respective confidence scores associated with the plurality of canonical business names satisfy the predetermined confidence threshold, presenting a list of the plurality of canonical business names in the chat session;

receiving user input indicating that from the list of the plurality of canonical business names, the first canonical business name is correct;

performing a customer relationship management (CRM) system lookup based at least on the unique business identifier, to identify a corresponding business account;

routing the chat session from the B2B chatbot to a human chat agent assigned to the corresponding business account.

14. One or more non-transitory machine-readable media storing instructions that, when executed by one or more processors, cause performance of operations comprising:

receiving, by a business-to-business (B2B) chatbot during a chat session with a user, user input comprising a user-supplied business name;

performing a business lookup based at least on the user-supplied business name, to obtain a first canonical business name and a unique business identifier associated with the first canonical business name;

presenting, by the B2B chatbot in the chat session, the first canonical business name;

receiving user input indicating that the first canonical business name is correct;

performing a customer relationship management (CRM) system lookup based at least on the unique business identifier, to identify a corresponding business account;

routing the chat session from the B2B chatbot to a human chat agent assigned to the corresponding business account;

wherein routing the chat session from the B2B chatbot to the human chat agent assigned to the corresponding business account is performed responsive to receiving the user input indicating that the first canonical business name is correct.

15. The one or more non-transitory machine-readable media of claim 14, the operations further comprising:

presenting, by the B2B chatbot in the chat session along with the first canonical business name, one or more of: a website address associated with the first canonical business name; an industry associated with the first canonical business name; a mailing address associated with the first canonical business name; a revenue associated with the first canonical business name; or an employee headcount associated with the first canonical business name.

16. A method comprising:

receiving, by a business-to-business (B2B) chatbot during a chat session with a user, user input comprising a user-supplied business name;

performing a business lookup based at least on the user-supplied business name, to obtain a first canonical business name and a unique business identifier associated with the first canonical business name;

wherein the first canonical business name is one of a plurality of canonical business names obtained responsive to the business lookup;

wherein each canonical business name in the plurality of canonical business names is associated with a respective unique business identifier;

wherein each canonical business name in the plurality of canonical business names is further associated with a respective confidence score;

determining that of the plurality of canonical business names, the first canonical business name is associated with a highest confidence score;

responsive to determining that the first canonical business name is associated with the highest confidence score, presenting the first canonical business name in the chat session;

receiving user input indicating that the first canonical business name is correct;

performing a customer relationship management (CRM) system lookup based at least on the unique business identifier, to identify a corresponding business account;

routing the chat session from the B2B chatbot to a human chat agent assigned to the corresponding business account;

wherein the method is performed by at least one device including a hardware processor.

17. A method comprising:

receiving, by a business-to-business (B2B) chatbot during a chat session with a user, user input comprising a user-supplied business name;

performing a business lookup based at least on the user-supplied business name, to obtain a first canonical business name and a unique business identifier associated with the first canonical business name;

wherein the first canonical business name is one of a plurality of canonical business names obtained responsive to the business lookup;

wherein each canonical business name in the plurality of canonical business names is associated with a respective unique business identifier;

wherein each canonical business name in the plurality of canonical business names is further associated with a respective confidence score;

determining that of the plurality of canonical business names, a second canonical business name is associated with a higher confidence score than the first canonical business name;

responsive to determining that the second canonical business name is associated with a higher confidence score than the first canonical business name, presenting the second canonical business name in the chat session;

receiving user input indicating that the second canonical business name is incorrect;

responsive to receiving the user input indicating that the second canonical business name is incorrect, presenting the first canonical business name in the chat session;

receiving user input indicating that the first canonical business name is correct;

performing a customer relationship management (CRM) system lookup based at least on the unique business identifier, to identify a corresponding business account;

routing the chat session from the B2B chatbot to a human chat agent assigned to the corresponding business account;

wherein the method is performed by at least one device including a hardware processor.

18. A method comprising:

receiving, by a business-to-business (B2B) chatbot during a chat session with a user, user input comprising a user-supplied business name;

performing a business lookup based at least on the user-supplied business name, to obtain a first canonical business name and a unique business identifier associated with the first canonical business name;

wherein the first canonical business name is one of a plurality of canonical business names obtained responsive to the business lookup;

wherein each canonical business name in the plurality of canonical business names is associated with a respective unique business identifier;

wherein each canonical business name in the plurality of canonical business names is further associated with a respective confidence score;

determining that none of the respective confidence scores associated with the plurality of canonical business names satisfy a predetermined confidence threshold;

responsive to determining that none of the respective confidence scores associated with the plurality of canonical business names satisfy the predetermined confidence threshold, presenting a list of the plurality of canonical business names in the chat session;

receiving user input indicating that from the list of the plurality of canonical business names, the first canonical business name is correct;

performing a customer relationship management (CRM) system lookup based at least on the unique business identifier, to identify a corresponding business account;

routing the chat session from the B2B chatbot to a human chat agent assigned to the corresponding business account;

wherein the method is performed by at least one device including a hardware processor.

19. A method comprising:

receiving, by a business-to-business (B2B) chatbot during a chat session with a user, user input comprising a user-supplied business name;

performing a business lookup based at least on the user-supplied business name, to obtain a first canonical business name and a unique business identifier associated with the first canonical business name;

presenting, by the B2B chatbot in the chat session, the first canonical business name;

receiving user input indicating that the first canonical business name is correct;

performing a customer relationship management (CRM) system lookup based at least on the unique business identifier, to identify a corresponding business account;

routing the chat session from the B2B chatbot to a human chat agent assigned to the corresponding business account;

wherein routing the chat session from the B2B chatbot to the human chat agent assigned to the corresponding business account is performed responsive to receiving the user input indicating that the first canonical business name is correct;

wherein the method is performed by at least one device including a hardware processor.

\* \* \* \* \*